Sept. 19, 1944.  P. PIFFATH  2,358,589
COMPASS
Filed Dec. 12, 1942

INVENTOR
Peter Piffath
BY
Kenyon & Kenyon
ATTORNEYS

Patented Sept. 19, 1944

2,358,589

UNITED STATES PATENT OFFICE 2,358,589

COMPASS

Peter Piffath, Great Neck, N. Y.

Application December 12, 1942, Serial No. 468,744

1 Claim. (Cl. 33—223)

This invention relates to compasses and has for an object a liquid-damped compass of novel design and capable of use as a sighting instrument.

According to this invention, the compass proper embodies a container having a transparent top with liquid filling the container and an apertured disk rotatably mounted in the container. The disk is immersed in the liquid and the apertures are filled with liquid. A magnetized bar is supported by the disk and the liquid damps the oscillations of the disk to bring it quickly to rest with the bar pointing north. The compass is provided with means for compensating for change in volume upon change in temperature so that the container is always completely filled with liquid.

The compass is mounted in a casing having an arm pivoted thereto as well as a cover. In the outer end of the arm is provided a lens and in the cover is provided a slot along which extends a filament. The filament lies in the same plane with the axis of the compass and the optical axis of the lens so that with the arm and cover arranged at right angles to the casing, the device may be used for sighting and the direction of any particular object may be determined by reference to the compass.

The device is provided with additional features which will be apparent to one skilled in the art from a subsequent description thereof.

Other objects, novel features and advantages of this invention will become apparent from the following specification and accompanying drawing, wherein.

Figure 1:
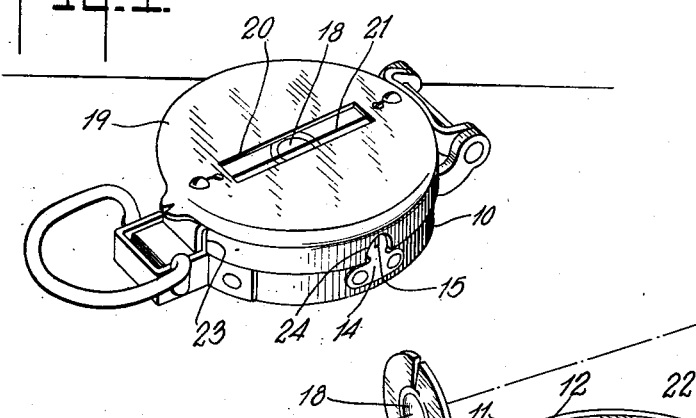
Fig. 1 is a perspective view of the device in closed condition.
Figure 2:
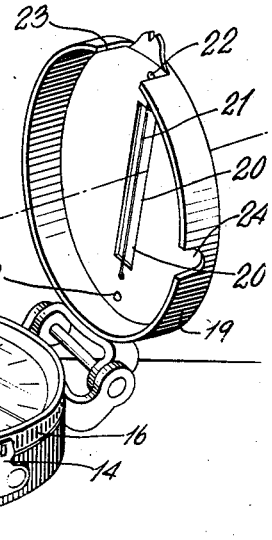
Fig. 2 is a perspective view of the device in open condition.
Figure 3:
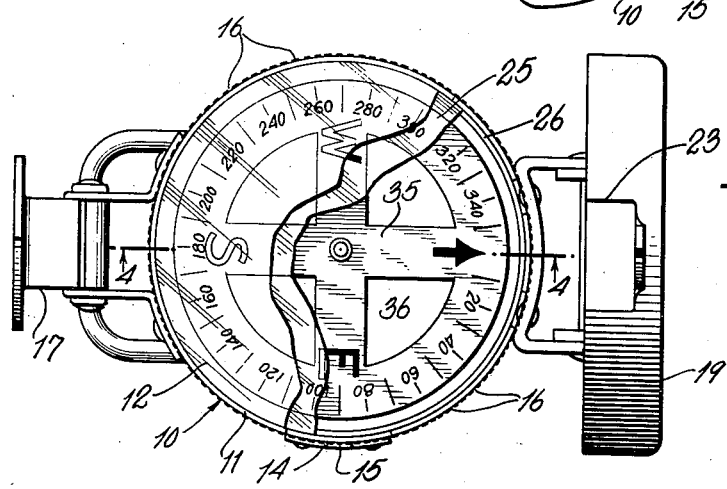
Fig. 3 is a plan view of Fig. 2.
Figure 4:
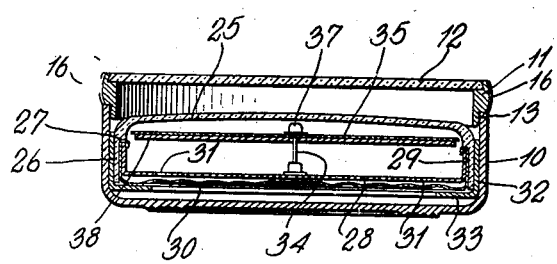
Fig. 4 is a section on the line 4—4 of Fig. 3.

A casing 10 of cylindrical cross-section is provided with a closure consisting of a ring 11 in which is mounted a transparent disk 12. The ring 11 is provided with a flange 13 extending into the casing. A spring tab 14 is mounted on the casing and is provided with an inwardly directed projection 15 which engages spaced indentations 16 in the periphery of the ring 11. The tab 14 serves to retain the ring 11 on the casing and prevent unintentional rotation of the ring. The indentations 16 are at regular intervals so that a predetermined extent of rotation of the ring 11 may be effected by advancing the ring to bring a predetermined number of indentations 16 successively into register with the projection 15.

An arm 17 is pivotally supported by the casing 10 and is provided at its free end with a sight lens 18. A cover 19 is pivotally supported by the casing 10 diametrically opposite the arm 17 and is provided with a diametrical slot 20 with a fine wire 21 extending lengthwise of the slot and being supported by the cover. The axis of a compass, later to be described, lies in the same plane with the wire 21 and the optical axis of the lens 18. At either end of the wire 21 and in alinement therewith is arranged a luminous dot 22. The arm 17 is arranged to fold across the transparent disk 12 and the cover 19 is arranged to close over the arm 17 around the ring 11, the cover being properly cut out at 23 to receive the arm 17 and also at 24 to receive the tab 14.

Within the casing is supported a compass container consisting of a transparent cover member 25 having a depending flange 26 provided with an interior shoulder 27. The compass container is completed by a metal bottom member 28 having an upstanding flange 29 extending into the cover member. A circular sheet 30 of metal foil underlies the bottom member 28 and extends around the top edge of the flange 29 so that a portion of the metal foil sheet is interposed between the flanges 26 and 29. The portion of the sheet 30 directly underlying the bottom member 28 is crinkled and tends to contact the bottom member in which are provided two or more apertures 31.

The compass container is supported in the casing 10 by a ring 32 which snugly fits the interior of the casing and has a horizontal flange 33 underlying the rim of the flange 26 and projecting slightly under the bottom member 28 and the foil 30. A vertical pin 34 is mounted on the bottom member 28 centrally thereof and terminates below the inner surface of the cover member 25. A thin metal disk 35 cut out to provide sector-shaped apertures 36 is provided with a jewel 37 in which is received the end of the pin 34 to mount the disk 35 for free rotation and for limited tilting. A magnetized iron bar 38 is attached to the disk 35, the upper surface of which is provided with luminous markings indicating the four compass points and degree subdivisions.

The interior of the compass container is filled with a petroleum derivative liquid which has a high boiling point and a low freezing point. Some of this liquid is contained in the space between the foil sheet 30 and the bottom member 28 into which space the liquid passes through the apertures 31. The foil 30 provides for change in volume of the liquid by reason of change of temperature. Upon expansion of the liquid due to an increase in temperature, the foil 30 moves away from the bottom member 28 sufficiently to accommodate the increase in volume and upon decrease in volume due to a decrease in temperature the foil 30 moves toward the bottom 28 to compensate for the decrease in volume. The container, therefore, is always kept filled with liquid.

Preferably, the transparent member 25 is provided with a luminous line lying in the same plane with the wire 21 and the transparent member 12 is provided with one or more radially arranged luminous lines at suitable intervals. All of the material used in the device except the bar 38 is now magnetic.

The device above described may be used as a compass in the normal manner. The liquid in the container serves to damp the oscillations of the disk 35 which is at all times completely surrounded by liquid irrespective of temperature variations as above described. The apertures 36 increase the damping effect of the liquid over what would be obtained by a continuous surface disk. The ring 11 may be rotated through an arc determined by the number of the indentations 17 passed by the projections 15 to locate the references lines thereon in any desired relation to the casing 10.

The device may also be used as a sighting instrument through the use of the lens 18 and wire 21. Both a sighting on a distant object and a compass reading may be effected at the same time by slight adjustment of the eye. Furthermore, various uses of this device will suggest themselves to one skilled in the use of compasses for sighting and determining direction. Night use of the device is made possible by the luminous markings and the luminous dots 22.

I claim:

A device of the character described comprising a transparent cover member having an integral flange substantially at right angles to the remainder, an interior circular shoulder in said flange, an apertured bottom member having an integral flange extending substantially at right angles to the remainder and fitting snugly within said cover flange into contacting relation with said shoulder, a sheet of metal foil underlying said bottom member with its periphery bent at right angles to the remainder to extend between said flange and around the rim of said bottom flange, the central portion of said sheet being corrugated, a band snugly fitting the outer surface of the cover flange and having an inwardly extending portion underlying an annular portion of said bottom member, means rotatably supporting a magnetic needle within the container formed by said cover member and bottom member, and liquid filling said container.

PETER PIFFATH.